US007447582B2

(12) United States Patent
Mori et al.

(10) Patent No.: US 7,447,582 B2
(45) Date of Patent: Nov. 4, 2008

(54) OIL PRESSURE CONTROL APPARATUS FOR AN AUTOMATIC TRANSMISSION (75) Inventors: Masanori Mori, Kariya (JP); Masato Shimei, Nagoya (JP); Munenori Kamino, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 64 days.

(21) Appl. No.: 11/062,557

(22) Filed: Feb. 23, 2005

(65) Prior Publication Data
US 2005/0197758 A1 Sep. 8, 2005

(30) Foreign Application Priority Data
Feb. 23, 2004 (JP) ............................. 2004-046695

(51) Int. Cl.
*G06F 7/00* (2006.01)
*G06F 17/00* (2006.01)
*G06F 19/00* (2006.01)
(52) U.S. Cl. ............................. 701/51; 701/68; 477/78; 477/85
(58) Field of Classification Search .................... 701/51, 701/61, 64, 66, 67, 68; 477/64, 68, 69, 70, 477/71, 73, 74, 75, 77, 78, 79, 80, 85
See application file for complete search history.

(56) References Cited
U.S. PATENT DOCUMENTS
5,165,308 A * 11/1992 Asada et al. ................ 477/154

| | | | |
|---|---|---|---|
| 5,349,885 A * | 9/1994 | Yoshimura et al. | 477/61 |
| 6,243,637 B1 * | 6/2001 | Minowa et al. | 701/51 |
| 6,269,294 B1 * | 7/2001 | Saito et al. | 701/54 |
| 6,421,597 B2 * | 7/2002 | Kon et al. | 701/51 |
| 6,843,756 B2 * | 1/2005 | Sato et al. | 477/144 |
| 2002/0025883 A1 * | 2/2002 | Kimura et al. | 477/117 |
| 2002/0116109 A1 * | 8/2002 | Takatori et al. | 701/55 |

FOREIGN PATENT DOCUMENTS
JP            6-341525            12/1994

* cited by examiner

*Primary Examiner*—Jack W Keith
*Assistant Examiner*—Edward Pipala
(74) *Attorney, Agent, or Firm*—Buchanan Ingersoll & Rooney PC (57) ABSTRACT An oil pressure control apparatus for an automatic transmission includes a calculating means for calculating, on the basis of a transmission output shaft rotational speed, at a time of a shift operation from a neutral shift stage to another shift stage appropriate to a vehicle driving condition, output-side rotational speeds of frictional engagement elements, and a shift stage selecting means for selecting a shift stage, in which oil with line pressure is supplied to a first frictional engagement element, from among the frictional engagement elements, and in which a minimum difference exists between the output-side rotational speed of the first frictional engagement element and an input-side rotational speed of a second frictional engagement element, from among the plural frictional engagement elements. The second frictional engagement element corresponds to the first frictional engagement element for the shift stage selected by the shift stage selecting means.

5 Claims, 6 Drawing Sheets

OIL PRESSURE CONTROL APPARATUS FOR AN AUTOMATIC TRANSMISSION

CROSS REFERENCE TO RELATED APPLICATIONS

This application is based on and claims priority under 35 U.S.C. §119 with respect to Japanese Patent Application 2004-046695, filed on Feb. 23, 2004, the entire content of which is incorporated herein by reference.

FIELD OF THE INVENTION

This invention generally relates to an oil pressure control apparatus for an automatic transmission. More specifically, this invention pertains to an oil pressure control apparatus for an automatic transmission, an oil pressure control apparatus which, when a shift operation from a neutral shift stage to another shift stage appropriate to an actual driving condition is performed while a vehicle is being driven, is capable of preventing the occurrence of shift shock, even in the event of line pressure being exerted on a frictional engagement element.

BACKGROUND

In a conventional automatic transmission, pressure levels of oil selectively supplied to plural frictional engagement elements (frictional clutches and frictional brakes) have been controlled, at times of engagement and disengagement of such elements, by means of a combination of an accumulator and an orifice. However, because, in order to perform the function of an accumulator to a sufficiently high degree, an accumulator having a relatively large volume is required, the volume of an automatic transmission provided with plural accumulators for purposes of attaining a sufficient degree of oil pressure, may rise to an undesirable level.

In light of the foregoing, proposals have recently been made to introduce a method of controlling pressure levels of oil supplied to these frictional engagement elements without employing an accumulator. Specifically, in this oil pressure level controlling method, pressure levels of oil supplied to the frictional engagement elements are controlled by controlling directly, by means of a solenoid valve, a pressure level of oil from an oil pressure source. So far, a smooth and highly positive response has been achieved at a shift operation.

As an oil pressure control apparatus for this type of automatic transmission, JP06(1994)-341525A discloses an oil pressure control apparatus for an automatic transmission linked to an engine, an automatic transmission in which a shift stage is established by releasing (disengaging) a predetermined, first, frictional engagement element and by engaging another, second, frictional engagement element. The oil pressure control apparatus includes: a pressure regulating mechanism capable of regulating a pressure level of oil supplied to the second frictional engagement element, and at the same time capable of adjusting a pressure regulating property; a pressure regulation commanding means which outputs a signal of command to the pressure regulating mechanism; shift condition detecting means for detecting at least either rise in engine fuel at a shift operation or engagement and disengagement of the frictional engagement elements; and pressure regulating property changing means for changing, on the basis of a detecting result of the shift condition detecting means, a pressure regulating property of the pressure regulating mechanism.

In this oil pressure control apparatus for an automatic transmission, the level of the oil pressure is selected, in accordance with a shift line diagram (a map or a database), from among whether it is a level of a line pressure, whether the level of the oil pressure has dropped, and whether the level of the oil pressure has risen. When a shift operation is performed in accordance with the shift line diagram, a shift shock can be absorbed by regulating a pressure level of oil supplied to a frictional engagement element, for example by reducing, or alternatively raising, a pressure level of oil supplied thereto.

When a disengagement condition, in which all frictional engagement elements in an automatic transmission have been disengaged, is switched to an engagement condition, in which a predetermined frictional engagement element, from among the frictional engagement elements, is engaged, i.e., when a neutral shift stage is switched to a shift stage appropriate to an actual vehicle driving condition, it is necessary that at least two of the frictional engagement elements be engaged. In recent years, oil pressure control elements such as solenoid valves have been reduced to the maximum possible extent, and the number of pressure regulating valves has accordingly been restricted to a minimum. As a result, at least one of the two frictional engagement elements is being introduced with oil with line pressure not being regulated. If oil with line pressure is supplied to one of the two frictional engagement elements, and oil pressure increasing control, or oil pressure decreasing control, is applied to the other, this makes it impossible to control the pressure level of oil with line pressure exerted on the one of the frictional engagement elements. In such circumstances, when a high degree of line pressure from an oil pump is exerted on the first frictional engagement element, an engagement condition is suddenly produced, synchronization of rotation of an input-side rotational member of the frictional engagement element and rotation of an output-side rotational member thereof occurs abruptly, and on occasions this may result in a high degree of shift shock.

The present invention has been made in view of the above circumstances, and provides an oil pressure control apparatus for an automatic transmission capable of avoiding the occurrence of shift shock, at the time of a shift operation from a neutral shift stage to an other shift stage in an automatic transmission while a vehicle is being driven, even when oil with line pressure is supplied to a frictional engagement element.

SUMMARY OF THE INVENTION

According to an aspect of the present invention, an oil pressure control apparatus for an automatic transmission includes: plural frictional engagement elements capable of establishing plural shift stages in a automatic transmission by combinations of engagement and disengagement of the plural frictional engagement elements; and a controller configured to select at least one of the plural frictional engagement elements to be supplied with oil pressure in accordance with one of the combinations of engagement and disengagement of the plural frictional engagement elements and to supply oil pressure to the at least one of the plural frictional engagement elements. The controller includes: a calculating means for calculating, on the basis of information relevant to an output rotational speed from an output shaft rotational speed sensor, at a time of a shift operation from a neutral shift stage to another shift stage appropriate to a vehicle driving condition, an output-side rotational speed of each of the plural frictional engagement elements; and a shift stage selecting means for selecting a shift stage, in which oil with line pressure is supplied to a first frictional engagement element, from among the plural frictional engagement elements, and in which a minimum difference exists between the output-side rotational speed of the first frictional engagement element and an input-side rotational speed of a second frictional engagement element, from among the plural frictional engagement elements. The second frictional engagement element corresponds to the first frictional engagement element for the shift stage selected by the shift stage selecting means.

According to another aspect of the present invention, an oil pressure control apparatus for an automatic transmission includes: plural frictional engagement elements capable of establishing plural shift stages in a automatic transmission by combinations of engagement and disengagement of the plural frictional engagement elements; and a controller configured to select at least one of the plural frictional engagement elements to be supplied with oil pressure in accordance with one of the combinations of engagement and disengagement of the plural frictional engagement elements and to supply oil pressure to the at least one of the plural frictional engagement elements. The controller includes: a calculating means for calculating, on the basis of information relevant to an output rotational speed from an output shaft rotational speed sensor, at a time of a shift operation from a neutral shift stage to another shift stage appropriate to a vehicle driving condition, an output-side rotational speed of each of the plural frictional engagement elements; and a shift stage selecting means for selecting a shift stage, in which oil with line pressure is supplied to a first frictional engagement element, from among the plural frictional engagement elements, in which a minimum difference exists between the output-side rotational speed of the first frictional engagement element and an input-side rotational speed of a second frictional engagement element, from among the plural frictional engagement elements, and in which the input-side rotational speed of the second frictional engagement element does not rise in response to an engagement of the first frictional engagement element. The second frictional engagement element corresponds to the first frictional engagement element for the shift stage selected by the shift stage selecting means.

According to further aspect of the present invention, an oil pressure control apparatus for an automatic transmission includes: plural frictional engagement elements capable of establishing plural shift stages in a automatic transmission by combinations of engagement and disengagement of the plural frictional engagement elements; and a controller configured to select at least one of the plural frictional engagement elements to be supplied with oil pressure in accordance with one of the combinations of engagement and disengagement of the plural frictional engagement elements and to supply oil pressure to the at least one of the plural frictional engagement elements. The controller includes: a calculating means for calculating, on a basis of information relevant to an output rotational speed from an output shaft rotational speed sensor, at a time of a shift operation from a neutral shift stage to another shift stage appropriate to a vehicle driving condition, an output-side rotational speed of each of the plural frictional engagement elements; a shift stage selecting means for selecting a shift stage, in which oil with line pressure is supplied to a first frictional engagement element, from among the plural frictional engagement elements, in which a minimum difference exists between the output-side rotational speed of the first frictional engagement element and an input-side rotational speed of a second frictional engagement element, from among the plural frictional engagement elements, a second frictional engagement element corresponding to the first frictional engagement element for the shift stage selected by the shift stage selecting means, and in which the input-side rotational speed of the second frictional engagement element rises in response to an engagement of the first frictional engagement element; and an engine rotational speed controlling means for controlling an engine rotational speed so as to substantially synchronize the output-side rotational speed of the first frictional engagement element for the shift stage selected by the shift stage selecting means with the input-side rotational speed of the second frictional engagement element corresponding to the first frictional engagement element. Therefore, oil pressure to be supplied can be controlled.

It is preferable that the controller includes a manual operation prohibiting means for prohibiting a manual operation of an accelerator pedal at a time of the shift operation from the neutral shift stage to the another shift stage appropriate to the vehicle driving condition.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
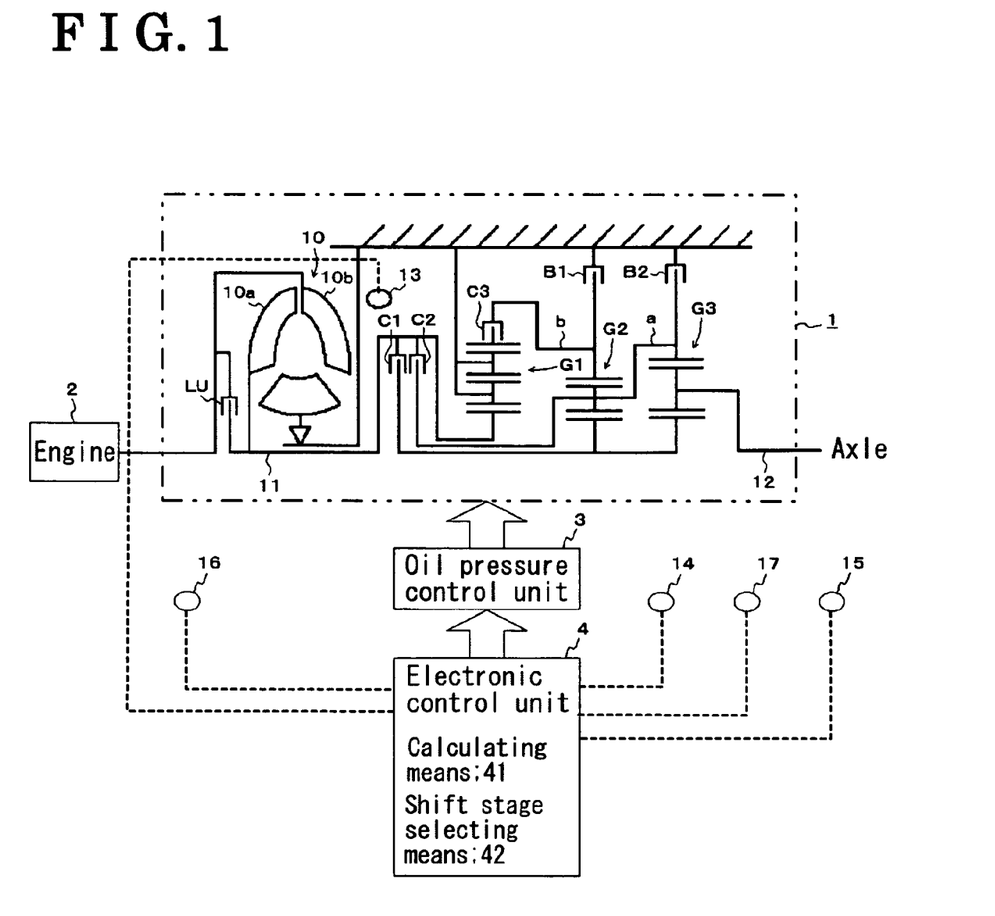
FIG. 1 is a block view schematically illustrating an entire structure of a transmission system having an oil pressure control apparatus for an automatic transmission according to an first embodiment of the present invention.

Embodiments of the present invention will be described hereinbelow in detail with reference to the accompanying drawings. An automatic transmission 1 is connected to an output shaft of an engine 2, i.e., a crankshaft, and includes an oil pressure control unit 3 and an electronic control unit (i.e., a controller) 4. A first embodiment of the present invention is subject to a shift operation from a neutral shift stage to another shift stage in the automatic transmission 1 while a vehicle is being driven in a forward direction. The shift stage corresponds to a vehicle driving condition.

The automatic transmission 1 is configured with main elements such as a torque converter 10 connected to the crankshaft of the engine 2, plural gear trains and plural frictional engagement elements. The automatic transmission 1 includes an input shaft 11 connected to a turbine runner 10a of the torque converter 10 and an output shaft 12 linked with axles via a differential gear (not shown).

As the plural gear trains, a first double pinion planetary gear train G1 connected to the input shaft 11, a second single pinion planetary gear train G2 and a third single pinion planetary gear G3 are arranged in sequential order in the automatic transmission 1.

As the plural frictional engagement elements, five frictional engagement elements: a first frictional clutch C1; a second frictional clutch C2; a third frictional clutch C3; a first frictional brake B1; and a second frictional brake B2 are installed in the automatic transmission 1. In this automatic transmission 1, the oil pressure control unit 3 and the electronic control unit 4 selectively determine appropriate combinations of engagement and disengagement of the frictional engagement elements C1, C2, C3, B1 and B2, and both a shift stage in the automatic transmission 1 and a shift pattern described later can be switched respectively in accordance with a selected combination of engagement and disengagement of these frictional engagement elements. When the frictional engagement elements C1, C2, C3, B1 and B2 are respectively supplied, by the oil pressure control unit 3, with a high degree of oil pressure, it makes the respective frictional engagement elements move into an engagement conditions. On the other hand, when these frictional engagement elements are supplied, by the oil pressure control unit 3, with a low degree of oil pressure, the respective frictional engagement elements move into a disengagement condition.

The torque converter 10 includes the turbine runner 10a at an output side thereof and a pump impeller 10b at an input side thereof. In order to prevent, or reduce, torque transmission loss caused by slippage of fluids, the torque converter 10 further includes a lock-up clutch LU which, in the event that a rotational speed difference between the turbine runner 10a and the pump impeller 10b is relatively small, interconnects the turbine runner 10a and the pump impeller 10b, thus enabling driving torque from the engine to be transmitted reliably to the automatic transmission 1.

The oil pressure control unit 3 is a part of the oil pressure control apparatus for an automatic transmission according to the first embodiment of the present invention, and incorporates an oil pressure circuit provided with solenoid valves such as linear solenoid valves, control valves and shift valves. Oil paths for supplying oil to the frictional engagement elements in the oil pressure circuit are selectively switched in response to control by the electronic control unit 4. Further, in response to control by the electronic control unit 4, frictional engagement elements, on which oil pressure is to be applied, can be determined from among the frictional engagement elements C1, C2, C3, B1 and B2. Namely, engagement and disengagement of the frictional engagement elements C1, C2, C3, B1 and B2 can be selectively determined. Eventually, the oil pressure control unit 3 controls degrees of oil pressure to be applied to the frictional engagement elements selected.

The electronic control unit 4 is, likewise, a part of the oil pressure control apparatus for an automatic transmission according to the first embodiment of the present invention, and incorporates a microcomputer that stores a shift line diagram (a map or a database). Outputs from various sensors are input into the electronic control unit 4, and, on the basis of such outputs, operations of the solenoid valves of the oil pressure control unit 3, such as linear solenoid valves, control valves and shift valves, are duly controlled.

The electronic control unit 4 is input with outputs from various sensors and controls, on the basis of outputs from various sensors, operations of the solenoid valves, such as linear solenoid valves, control valves and shift valves, of the oil pressure control unit 3.

The electronic control unit 4 further incorporates a calculating means 41 and a shift stage selecting means 42. When a shift operation is made from a neutral shift stage to another shift stage appropriate to a vehicle driving condition, i.e., when the electronic control unit 4 receives from a shift position sensor 14 a signal representing a shift operation of a shift lever (not shown) from a neutral (N) range to a drive (D) range, the calculating means 41 calculates, on the basis of information, received from an output shaft rotational speed sensor 15, relevant to an output shaft rotational speed, and expressed in terms of No, an output-side rotational speed of each frictional engagement element C1, C2, C3, B1 and B2. The shift stage selecting means 42 selects a shift stage in the transmission 1, in which oil with line pressure is supplied to a first frictional engagement element, selected from among the frictional engagement elements C1, C2, C3, B1 and B2, and in which a minimum difference exists between the output-side rotational speed of the first frictional engagement element and an input-side rotational speed of a second frictional engagement element corresponding to the first frictional engagement element. The second frictional engagement element is also selected from among the frictional engagement elements C1, C2, C3, B1 and B2. According to the first embodiment of the present invention, a minimum difference hereinafter corresponds to the minimum value, selected from among respective differences between an output-side rotational speed of a first frictional engagement element for respective shift stages and an input-side rotational speed of a second frictional engagement element for the respective shift stages. The shift stage selecting means 42 then establishes a selected shift stage in the transmission 1 by controlling the oil pressure control unit 3. According to the first embodiment of the present invention, as is apparent from Table 1, the first frictional engagement element is either the first frictional clutch C1, which is supplied with oil with line pressure so as to establish a third shift stage in the transmission 1, or the second frictional clutch C2, which is supplied with oil with line pressure so as to establish one of the fourth, fifth and sixth shift stages therein. The input-side rotational speed of the second frictional engagement element substantially corresponds to a turbine runner rotational speed Nt from a turbine runner rotational speed sensor 13.

According to the first embodiment of the present invention, the automatic transmission 1 includes the turbine runner rotational speed sensor 13 for detecting the turbine runner rotational speed Nt of the input shaft 11 (the turbine runner 10a). Output information (the turbine runner rotational speed Nt) from the turbine runner rotational speed sensor 13 is then input into the electronic control unit 4. The automatic transmission system includes the shift position sensor 14 for detecting a position of a shift lever (not shown) manually operated by a driver, i.e., a drive range (R range, N range and D range) being selected. Output information (drive range) from the shift position sensor 14 is then inputted into the electronic control unit 4. The automatic transmission system further includes the output shaft rotational speed sensor 15 for detecting the output shaft rotational speed, expressed in terms of No, of the output shaft 12 of the automatic transmission 1. Output information (the output shaft rotational speed No) from the output shaft rotational speed sensor 15 is then inputted into the electronic control unit 4. The automatic transmission system still further includes an engine rotational speed sensor 16 for detecting an engine rotational speed, expressed as Ne. Output information (an engine rotational speed Ne) from the engine rotational speed sensor 16 is then inputted into the electronic control unit 4. The automatic transmission system still further includes a throttle opening degree sensor 17 for detecting a throttle opening degree θ of the engine 2. Output information (a throttle opening degreeθ of the engine 2) from the throttle opening degree sensor 17 is then inputted into the electronic control unit 4.

Figure 2:
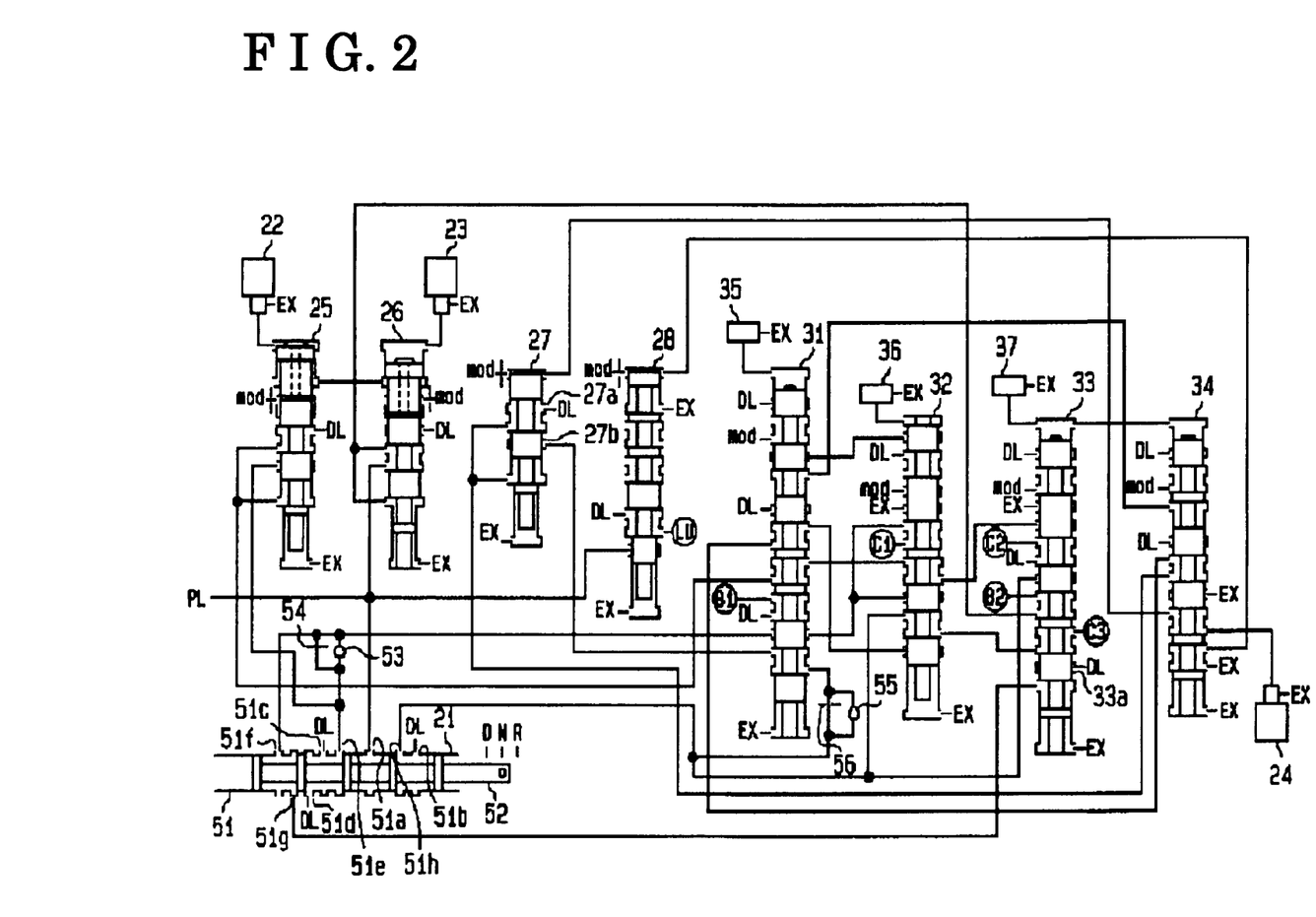
FIG. 2 is an oil pressure circuit applied according to the first embodiment of the present invention.

Next, explained below are a structure of the oil pressure control unit 3 and a method of controlling the same, by which engagement and disengagement of the frictional clutches C1, C2 and C3, and of the frictional brakes B1 and B2 are controlled.

As is illustrated in FIG. 2, the oil pressure control unit 3 takes in oil with line pressure PL generated on the basis of an outlet pressure from an oil pump (not shown). The oil pressure control unit 3 incorporates, therein, a manual valve 21, a first linear solenoid valve 22, a second linear solenoid valve 23, a third linear solenoid valve 24, a first control valve 25, a second control valve 26, a start control valve 27, a lock-up (abbreviated to LU) control valve 28, a first shift valve 31, a second shift valve 32, a third shift valve 33, a fourth shift valve 34 and three on-off solenoid valves 35, 36 and 37. Each of the first linear solenoid valve 22, the second linear solenoid valve 23 and the third linear solenoid valve 24 outputs, by use of the line pressure PL, oil pressure regulated in response to electric current supplied thereto.

The manual valve 21 is operated for the purpose of selectively determining appropriate oil pressure circuits associated with a drive range selected by a manual operation of a selector lever (not shown). Specifically, the manual valve 21 is provided with a valve body 52, which, in association with an operation of a selector lever, is slidably movable within a valve casing 51. The manual valve 21 contains a first port 51a for taking in oil with line pressure PL, and a second port 51b, a third port 51c and a fourth port 51d, each of which forms a drain portion and a drain passage for draining oil pressure within the valve casing 51 to an auxiliary drain circuit maintained at a low pressure degree. The manual valve 21 further contains a fifth port 5 1e, which communicates with one side of a first check ball (check valve) 53, i.e., with an upstream side of a first check ball (check valve) 53; a sixth port 51f, which communicates with the other side of the first check ball 53, i.e., with a downstream side of the first check ball 53; a seventh port 51g communicating with the third shift valve 33; and an eighth port 51h which communicates with one side of a second check ball 55, i.e., with an upstream side of a second check ball 55. The other side of the second check ball 55 is connected to the first shift valve 31. According to the first embodiment of the present invention, a first orifice 54 is provided in an oil passage that by-passes both sides of the first check ball 53, while a second orifice 56 is provided in an oil passage that by-passes both sides of the second check ball 55. Flow-restriction amount of the first and second orifices 54 and 56 are designed for purposes of restraining a level of oil pressure drained from a frictional engagement element that has been released from an engagement condition. On the other hand, no orifices are provided in the second, third and fourth ports 51b, 51c and 51d, and with a structure of this kind, oil pressure (of a high degree of pressure) of oil leaked can be drained quickly.

The first control valve 25 can take in regulated oil pressure outputted from the first linear solenoid valve 22, and, by use of line pressure PL in response to the regulated oil pressure taken in, can generate control pressure. The control pressure is outputted to a frictional engagement element. The second control valve 26 can take in regulated oil pressure outputted from the second linear solenoid valve 23, and, by use of line pressure PL in response to the introduced regulated oil pressure, can generate control pressure. The control pressure is outputted to a frictional engagement element. The start control valve 27 and the LU control valve 28 alternatively introduce regulated oil pressure outputted from the third linear solenoid valve 24, and, by use of line pressure PL in response to the regulated oil pressure taken in, can generate control pressure.

The start control valve 27 is operated for the purpose of outputting the control pressure especially when a vehicle starts in a rearward direction, or in a forward direction at a first shift stage. On the other hand, when the output shaft 12 of the transmission 1 has rotated at a relatively high rotational speed, for example at a third, fourth, fifth or sixth shift stage, the LU control valve 28 is operated for the purpose of outputting the control pressure to the lock-up piston LU (not shown) of the torque converter 10. As is apparent from the above explanation, the start control valve 27 and the LU control valve 28 can not be activated for use at the same time. Therefore, the operations of the start control valve 27 and the LU control valve 28 are switched by the fourth shift valve 34, and either the start control valve 27 or the LU control valve 28 outputs the control pressure in response to the regulated oil pressure outputted from the third linear solenoid valve 24.

The first, second, third and fourth shift valves 31, 32, 33 and 34 introduce, thereto, either line pressure PL or the control pressure outputted from at least one of the control valves 25, 26, 27 and 28. Moreover, the first, second, third and fourth shift valves 31, 32, 33 and 34 respectively switch supply of either line pressure PL or control pressure to the frictional engagement elements C1, C2, C3, B1 and B2.

On the basis of electric current supplied to the on-off solenoid valves 35 and 36, the on-off solenoid valves 35 and 36 modifies supply of oil pressure to the first and second shift valves 31 and 32 respectively, and thus switching operation conditions of the first and second shift valves 31 and 32. Moreover, on the basis of electric current supplied to the on-off solenoid valve 37, the on-off solenoid valve 37 modifies supply of oil pressure to the third and fourth shift valves 33 and 34 respectively, and thus switching operation conditions of the third and fourth shift valves 33 and 34.

When the first linear solenoid valve 22 is not electrically excited, the first linear solenoid valve 22 is designed to output, to the first control valve 25, regulated oil pressure that is controlled at substantially zero, while, when the first linear solenoid valve 22 is electrically excited, the first linear solenoid valve 22 is designed to output, to the first control valve 25, regulated oil pressure that has been raised in response to the increase in electric current supplied to the first linear solenoid valve 22. Likewise, when the third linear solenoid valve 24 is not electrically excited, the third linear solenoid valve 24 is designed to output, either to the start control valve 27 or to the LU control valve 28, regulated oil pressure that is controlled at substantially zero, while, when the third linear solenoid valve 24 is electrically excited, the third linear solenoid valve 24 is designed to output, either to the start control valve 27 or to the LU control valve 28, regulated oil pressure that has been raised in response to the increase in electric current supplied to the third linear solenoid valve 24. That is, when no electric current is supplied to the first and third linear solenoid valves 22 and 24, no regulated oil pressure is applied to the first control valve 25 and to either the start control valve 27 or the LU control valve 28. On the other hand, when the second linear solenoid valve 23 is not electrically excited, the second linear solenoid valve 23 is designed to output, to the second control valve 26, regulated oil pressure to the maximum degree, while, when the second linear solenoid valve 23 is electrically excited, the second linear solenoid valve 23 is designed to output, to the second control valve 26, regulated oil pressure which has dropped in response to an increase in electric current supplied to the second linear solenoid valve 23. That is, when electric current of the maximum degree is supplied to the second linear solenoid valve 23, no regulated oil pressure is applied to the second control valve 26.

When the first linear solenoid valve 22 is not electrically excited, the first control valve 25 generates the control pressure that is controlled at substantially zero, while, when the first linear solenoid valve 22 is electrically excited, the first control valve 25 generates control pressure that has been raised in response to an increase in electric current supplied to the first linear solenoid valve 22. Likewise, when the third linear solenoid valve 24 is not electrically excited, either the start control valve 27 or the LU control valve 28 generates control pressure that is controlled at substantially zero, while, when the third linear solenoid valve 24 is electrically excited, either the start control valve 27 or the LU control valve 28 generates control pressure that has been raised in response to an increase in electric current supplied to the third linear solenoid valve 24. On the other hand, when the second linear solenoid valve 23 is not electrically excited, the second control valve 26 generates control pressure to the maximum degree, while, when the second linear solenoid valve 23 is electrically excited, the second control valve 26 generates control pressure that has dropped in response to an increase in electric current supplied to the second control valve 26. That is, when no electric current is supplied to the first and third linear solenoid valves 22 and 24, the first control valve 25, the start control valve 27 and the LU control valve 28 generate respectively control pressure that is controlled substantially at zero. When the second linear solenoid valve 23 is supplied with electric current to the maximum degree, the second control valve 26 generates control pressure that is controlled substantially at zero.

When the on-off solenoid valve 35 is electrically excited, oil pressure is supplied to the first shift valve 31, while, when the on-off solenoid valve 35 is not electrically excited, oil pressure is not supplied to the first shift valve 31. Likewise, when the on-off solenoid valve 36 is electrically excited, oil pressure is supplied to the second shift valve 32, while, when the on-off solenoid valve 36 is not electrically excited, oil pressure is not supplied to the second shift valve 32. That is, both of the on-off solenoid valves 35 and 36 are normally closed type solenoid valves. Still likewise, when the on-off solenoid valve 37 is electrically excited, oil pressure is supplied to the third and fourth shift valves 33 and 34, while, when the on-off solenoid valve 37 is not electrically excited, oil pressure is not supplied to the third and fourth shift valves 33 and 34. That is, the on-off solenoid valve 37 is also a normally closed type solenoid valve.

When the first and second shift valves 31 and 32 are subjected to oil pressure from the on-off solenoid valves 35 and 36 respectively, the first and second shift valves 31 and 32 are shifted to a first operated condition, in which a valve body of each solenoid valve 35 and 36 is positioned at the downside in FIG. 2. On the other hand, when the first and second shift valves 31 and 32 are not subjected to oil pressure from the on-off solenoid valves 35 and 36 respectively, the first and second shift valves 31 and 32 are shifted to a second operated condition, in which a valve body of each solenoid valve 35 and 36 is positioned at the upperside in FIG. 2. When the third and fourth shift valves 33 and 34 are subjected to oil pressure from the on-off solenoid valve 37, the third and fourth shift valves 33 and 34 are shifted to a first operated condition, in which a valve body of each solenoid valve 33 and 34 is positioned at the downside in FIG. 2. On the other hand, when the third and fourth shift valves 33 and 34 are not subjected to oil pressure from the on-off solenoid valve 37, the third and fourth shift valves 33 and 34 are shifted to a second operated condition, in which a valve body of each solenoid valve 33 and 34 is positioned at the upperside in FIG. 2.

Supply of electric current to the linear solenoid valves 22, 23 and 24, and to the on-off solenoid valves 35, 36 and 37 is controlled, by the electronic control unit 4, on the basis of output information from the turbine runner rotational speed sensor 13, the shift position sensor 14, the output shaft rotational speed sensor 15, the engine rotational speed sensor 16, and the throttle opening degree sensor 17. Therefore, a predetermined shift pattern appropriate to a vehicle driving condition can be selected, and a predetermined shift state can be established in the transmission 1 in accordance with the shift pattern selected.

The following explanation will be given, with reference to Table 1, for explaining engagement and disengagement of the frictional engagement elements C1, C2, C3, B1 and B2, and for explaining a relationship between shift stages and combinations of engagement and disengagement of the frictional engagement elements.

TABLE 1

| N | N | C1 | C2 | C3 | B1 | B2 |
|---|---|----|----|----|----|----|
| D | 1st | C | | | | |
|   | 2nd | C | | | A | |
|   | 3rd | PL | | B | | |
|   | 4th | A | PL | | | |
|   | 5th | | PL | B | | |
|   | 6th | | PL | | A | |

As is summarized in Table 1, a reference symbol "A" indicates a frictional engagement element which can be controlled by the first linear solenoid valve 22, a reference symbol "B" indicates a frictional engagement element which can be controlled by the second linear solenoid valve 23, and a reference symbol "C" indicates a frictional engagement element which can be controlled by the third linear solenoid valve 24. In other words, "A" indicates a frictional engagement element which can be applied with control pressure from the first control valve 25, "B" indicates a frictional engagement element which can be applied with control pressure from the second control valve 26, and "C" indicates a frictional engagement element which can be applied with control pressure from the start control valve 27.

The automatic transmission 1 according to the first embodiment of the present invention can attain six forward shift stages (under-drive of the first, second, third and fourth shift stages, and over-drive of the fifth and sixth shift stages) and a single reverse shift stage. When a neutral shift stage is selected, all the frictional engagement elements are at disengagement conditions. When a first shift stage is established in the automatic transmission 1, the first frictional clutch C1 is engaged by control pressure (pressure increase), and the other frictional engagement elements are in the disengagement conditions. When a second shift stage is established in the automatic transmission 1, the first frictional clutch C1 is engaged by control pressure (pressure increase), and the first frictional brake B1 is also engaged by control pressure (pressure increase). In such case, the other frictional engagement elements are in the disengagement conditions. When a third shift stage is established in the automatic transmission 1, the first frictional clutch C1 is engaged by line pressure PL, and the third frictional clutch C3 is engaged by control pressure (pressure decrease). In such case, the other frictional engagement elements are at the disengagement conditions. When a fourth shift stage is established in the automatic transmission 1, the first frictional clutch C1 is engaged by control pressure (pressure increase), and the second frictional clutch C2 is engaged by line pressure PL. In such case, the other frictional engagement elements are in the disengagement conditions. When a fifth shift stage is established in the automatic transmission 1, the second frictional clutch C2 is engaged by line pressure PL, and the third frictional clutch C3 is engaged by control pressure (pressure decrease). In such case, the other frictional engagement elements are in the disengagement conditions. When a sixth shift stage is established in the automatic transmission 1, the second frictional clutch C2 is engaged by line pressure PL, and the first frictional brake B1 is engaged by control pressure (pressure increase). In such case, the other frictional engagement elements are in the disengagement conditions.

Table 3 summarized above explains an elemental relationship between a drive range (N range and D range) selected in response to a manual operation of a shift lever and a shift stage established in the automatic transmission 1. The oil pressure control apparatus for an automatic transmission according to the first embodiment of the present invention is subjected to a shift operation from a neutral shift stage to a shift stage appropriate to a vehicle driving condition while a vehicle is being driven in a forward direction. Therefore, in Table 3, explanation of a relationship between a reverse (R) range and a shift stage established in the automatic tranmission 1 is omitted.

Next, an operation of the oil pressure control apparatus for an automatic transmission according to the first embodiment of the present invention will be described.

In general, a vehicle drives with a shift lever positioned at a D range. However, there is a possibility of creeping performance occurring immediately before the vehicle stops. In such circumstances, a braking force, i.e., a force to operate a brake pedal, which is required to stop the vehicle, may be increased. In order to avoid such requirement of the braking force, on occasions, while the vehicle is being driven in a forward direction, the shift lever can be switched from the D range to the N range, inter aria for the purpose of eliminating creeping performance. This shift lever can be then returned, prior to the vehicle stops, to the D range from the N range, for the purpose of driving the vehicle again in the forward direction. Moreover, as far as a truck is concerned, in order to reduce fuel consumption to an economic level, a shift lever can be switched from a D range to an N range while the truck is being driven at a relatively low speed such as approximately 40 km/h. In such case, an engine rotational speed can be dropped. In the eventuality that vehicle acceleration is required after switching the shift lever to the N range, the shift lever can be returned to the D range.

Assuming the following circumstance, the first embodiment is explained below. While a vehicle is being driven on a moderate down slope under conditions of a vehicle speed of 30 km/h, a fourth shift stage being established in the transmission 1, the engine rotational speed of 1000 rpm and the rotational speed of the frictional clutch C1 of 1000 rpm (Engine rotational speed: C1 gear ratio=1:1), a shift lever is operated to an N range. After a vehicle idling drive for a while, the vehicle speed is controlled at 30 km/h, a neutral shift stage is established in the transmission 1, and the engine rotational speed is controlled at 700 rpm. In such circumstances, a shift lever is positioned at a D range for the purpose of accelerating a vehicle. In such case, a shift stage, which is determined in accordance with a shift map on the basis of the vehicle speed, is a third shift stage. However, the shift stage selecting means 42 according to the first embodiment of the present invention selects a fourth shift stage, in which oil with line pressure is supplied to the second frictional clutch C2, the minimum difference exists between the output-side rotational speed of the first frictional engagement element, from among all the frictional engagement elements, and the input-side rotational speed of the second frictional engagement element corresponding to the first frictional engagement element. Therefore, a shift shock can be effectively reduced. In other words, this means that the third shift stage has been selected wherein oil with line pressure has been supplied to the first frictional clutch C1. Therefore, it is possible to reduce or avoid the occurrence of shift shock due to a difference between the input-side rotational speed of 700 rpm (the engine rotational speed, the turbine runner rotational speed) and the output-side rotational speed of 1000 rpm (the rotational speed of the first frictional clutch C1 to be supplied with oil with line pressure PL).

As for the above-described circumstances, in an automatic transmission, in which an accumulator is not employed, and line pressure is supplied to one (a first frictional engagement element) of the two frictional engagement elements engaged for establishing a shift stage, a shift shock may, on occasions, occur when there is a large rotational speed difference between the output-side rotational speed of the first frictional engagement element and an input-side rotational speed of a frictional engagement element (a second frictional engagement element) corresponding to the first frictional engagement element. The input-side rotational speed substantially corresponds to the turbine runner rotational speed Nt.

Operation of the electronic control unit 4, which is preferable in order to avoid, or to reduce, this sort of shift shock, according to the first embodiment of the present invention will be explained below.

The output-side rotational speed of at least each frictional engagement element, which is supplied with line pressure, is calculated on the basis of the output shaft rotational speed No at the time that a shift lever is switched from an N range to a D range. As is summarized in Table 3, according to the first embodiment of the present invention, the frictional engagement elements, which are supplied with line pressure, are the first frictional clutch C1 and the second frictional clutch C2. The output-side rotational speed of each frictional engagement element can be computed on the basis of the output shaft rotational speed No and a gear ratio of each shift stage (constant), i.e., a reduction gear ratio (constant) of each shift stage. For example, the output-side rotational speed of the first frictional clutch C1, which is subjected to line pressure at the time that the third shift stage is established in the automatic transmission 1, is calculated by the formula: (Output shaft rotational speed No)×(Gear ratio at the third shift stage). The output-side rotational speed of the second frictional clutch C2, which is subjected to line pressure at the time that the fourth shift stage is established in the automatic transmission 1, is calculated by the formula: (Output shaft rotational speed No)×(Gear ratio at the fourth shift stage). The output-side rotational speed of the second frictional clutch C2, which is subjected to line pressure at the time that the fifth shift stage is established in the automatic transmission 1, is calculated by the formula: (Output shaft rotational speed No)×(Gear ratio at the fifth shift stage). The output-side rotational speed of the second frictional clutch C2, which is subjected to line pressure at the time that the sixth shift stage is established in the automatic transmission 1, is calculated by the formula: (Output shaft rotational speed No)×(Gear ratio at the sixth shift stage). Adding to the above, because no frictional engagement element is supplied with line pressure at the time that the first or second shift stage is established in the automatic transmission 1, the output-side rotational speeds of only the frictional engagement elements, which are supplied with line pressure at the time that the third, fourth, fifth and sixth shift stages are established in the automatic transmission 1, are calculated. As described above, it is preferable that the output-side rotational speed of each frictional engagement element is calculated on the basis of the output shaft rotational speed No. Alternatively, the output-side rotational speed of each frictional engagement element can be calculated on the basis of a vehicle speed at the time that a shift lever is switched from an N range to a D range.

In the next place after calculating the output-side rotational speeds, the electronic control unit 4 determines a shift stage from among the third, fourth, fifth and sixth shift stages, a shift stage in which line pressure is applied to the first frictional engagement element from among all the frictional engagement elements C1, C2, C3, B1 and B2, and the minimum difference exists between the output-side rotational speed of the first frictional engagement element and the input-side rotational speed of the frictional engagement element (the second frictional engagement element) corresponding to the first frictional engagement element. The electronic control unit 4 then controls oil pressure supplied to the first fictional engagement element (the first frictional clutch C1 or the second frictional clutch C2). This oil pressure control by the electronic control unit 4 is referred to as a preliminary control.

Following the preliminary control, a regular oil pressure control, whereby an appropriate shift operation is performed on the basis of a shift line diagram, is carried out while the shift lever is positioned at the D range. For example, the fourth shift stage, which is selected by the preliminary control, may on occasions be shifted down to the third shift stage, or may be on occasions maintained at the fourth shift stage. Therefore, according to the first embodiment of the present invention, at the time that a shift stage in the automatic transmission 1 is changed to another shift stage therein in response to a manual operation of a shift lever from an N range to a D range, it is possible to avoid occurrence of the shift shock even when line pressure is applied to a frictional engagement element.

Figure 3:
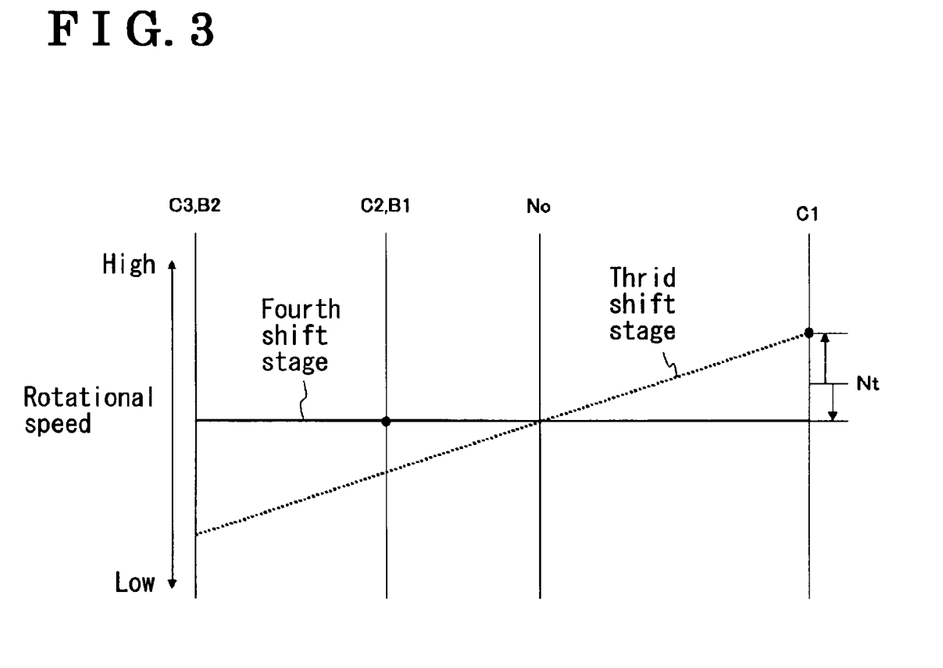
FIG. 3 is a diagram for explaining the method of determining a shift stage by an oil pressure control apparatus for an automatic transmission according to a second embodiment of the present invention.
Figure 4:
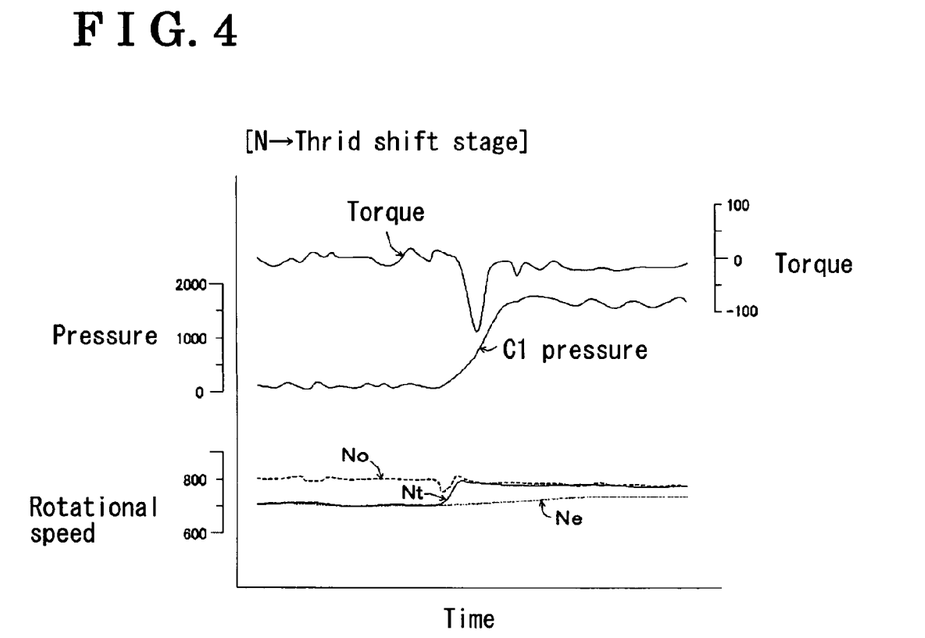
FIG. 4 is a diagram for explaining a relationship of an engine torque, a pressure level of oil actually supplied to a first frictional clutch, an output shaft rotational speed, a turbine runner rotational speed and an engine rotational speed, all of which are obtained at the time of a shift operation from a neutral shift stage to a third shift stage in an automatic transmission.
Figure 5:
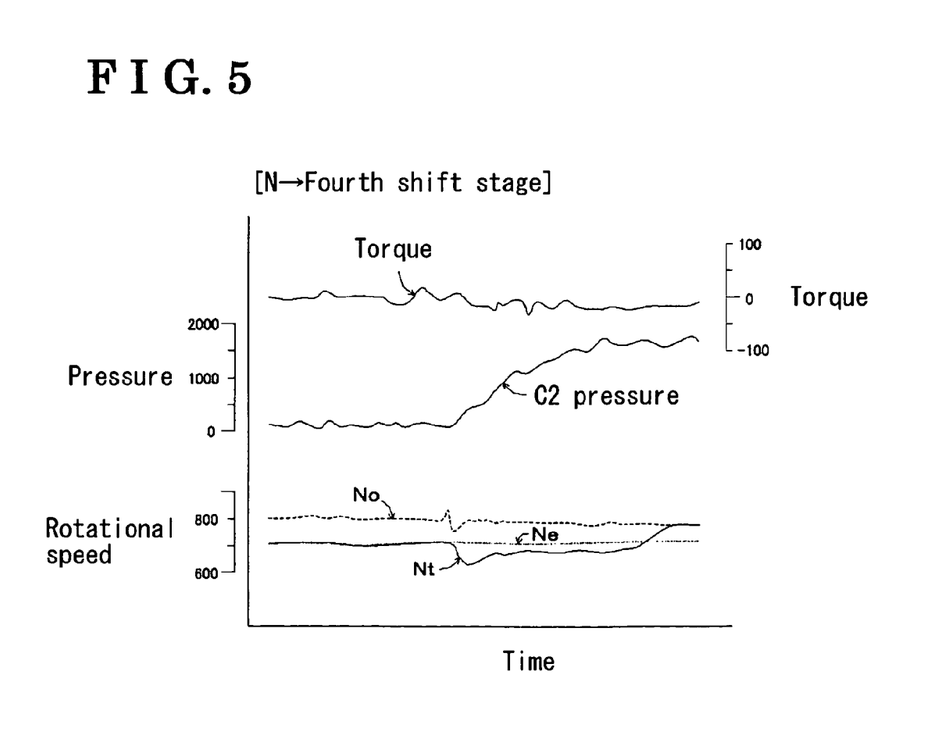
FIG. 5 is a diagram for explaining a relationship of an engine torque, a pressure level of oil actually supplied to a second frictional clutch, an output shaft rotational speed, a turbine runner rotational speed and an engine rotational speed, all of which are obtained at the time of a shift operation from a neutral shift stage to a fourth shift stage in an automatic transmission.

An oil pressure control apparatus for an automatic transmission according to a second embodiment of the present invention will be described below with reference to FIGS. 3, 4 and 5.

In the oil pressure control apparatus for an automatic transmission according to the first embodiment of the present invention, a shift stage in the transmission 1 is selected so as to supply oil with line pressure PL to the one (i.e., the first frictional engagement element, the first frictional clutch C1 or the second frictional clutch C2) of all the frictional engagement elements, the shift stage in which the minimum difference exists between the output-side rotational speed of the first frictional engagement element and the input-side rotational speed of the second frictional engagement element corresponding to the first frictional engagement element. However, in the eventuality that the output-side rotational speed of the first frictional engagement element is greater than the input-side rotational speed of the second frictional engagement element, there may on occasions be a possibility of the engine rotational speed, i.e., the turbine runner rotational speed, being increased in response to respective engagements of the first and second frictional engagements. In such case, there may be a danger of minor shift shock occurrence due to an engine-brake.

In light of the foregoing, in the oil pressure control apparatus for an automatic transmission according to the second embodiment of the present invention, the shift stage selecting means 42 selects a shift stage in the transmission 1, a shift stage in which oil with line pressure PL is supplied to the first frictional engagement element, in which a minimum difference exists between the output-side rotational speed of the first frictional engagement element and the input-side rotational speed of the second frictional engagement element corresponding to the first frictional engagement element, and in which the input-side rotational speed of the second frictional engagement element does not rise in the event that the first and second frictional engagement elements are respectively engaged. The electronic control unit 4 then controls the oil pressure control unit 3 so as to establish the shift stage selected by the shift stage selecting means 42, as described above. The other structures and functions of the oil pressure control apparatus for an automatic transmission according to the second embodiment are the same as those according to the first embodiment so that explanation thereof is omitted.

Namely, the output-side rotational speed of at least each frictional engagement element, which is supplied with oil of line pressure, is calculated on the basis of the output shaft rotational speed No at the time a shift lever is switched from an N range to a D range. As is summarized in Table 3, according to the second embodiment of the present invention, the frictional engagement elements, which are subjected to line pressure, are the first frictional clutch C1 and the second frictional clutch C2. As described above, it is preferable that the output-side rotational speed of each frictional engagement element is calculated on the basis of the output shaft rotational speed No. Alternatively, the output-side rotational speed of each frictional engagement element can be calculated on the basis of a vehicle speed at the time that a shift lever is switched from an N range to a D range.

In the next place, after calculating the output-side rotational speeds, the electronic control unit 4 determines a shift stage from among the third, fourth, fifth and sixth shift stages, a shift in which line pressure is applied to the first frictional engagement element, in which the minimum difference exists between the output-side rotational speed of the first frictional engagement element and the input-side rotational speed of the second frictional engagement element corresponding to the first frictional engagement element, and in which the input-side rotational speed of the second frictional engagement element does not rise in the event that the first and second frictional engagement elements are respectively engaged. The electronic control unit 4 then controls oil pressure supplied to the first frictional engagement element (the first frictional clutch C1 or the second frictional clutch C2). A regular oil pressure control, whereby an appropriate shift operation is performed on the basis of a shift line diagram, is carried out while the shift lever is positioned at the D range.

For example, when a shift lever is shifted from an N range to a D range while a vehicle is being driven at a vehicle speed of approximately 20 km/h, a possibility exists that a third or fourth shift stage will be selected. When the third shift stage is to be established in the automatic transmission 1, according to Table 1, it is the first frictional clutch C1 which is supposed to be supplied with oil with line pressure PL. However, as is explained in FIG. 3, because the output-side rotational speed of the first frictional clutch C1 is higher than the turbine rotational speed Nt, it is preferable that considerations is given to the possibility that the turbine runner rotational speed Nt, i.e., the engine rotational speed Ne, be increased in response to an engagement of the first frictional clutch C1. The output shaft rotational speed No is then reduced in response to an increase in the turbine runner rotational speed Nt. In such circumstances, torque transmitted from the engine to the transmission 1 may be temporarily reduced to a considerable degree, i.e., torque, which should be transmitted from the engine to the transmission 1, is returned to the engine. Therefore, a possibility exists of minor shift shock occurring due to an engine-brake.

On the other hand, when the fourth shift stage is to e established in the automatic transmission 1, according to Table 1, it is the second frictional clutch C2 which is supposed to be supplied with oil with line pressure PL. However, as is explained in FIG. 3, because the output-side rotational speed of the second frictional clutch C2 is lower than the turbine rotational speed Nt, it is preferable that considerations is given to the possibility that the turbine runner rotational speed Nt, i.e., the engine rotational speed Ne, be decreased in response to an engagement of the second frictional clutch C2. Meantime, the output shaft rotational speed No and torque, which is transmitted from the engine to the transmission 1, do not fluctuate to a great extent. Therefore, the possibility of occurrence of the shift shock is little. Further, the turbine rotational speed Nt in such case corresponds to the input-side rotational speed of the second frictional clutch C2 and is approximately similar to an idling engine rotational speed.

As described above, according to the second embodiment of the present invention, if a shift stage is selected, a shift stage (the fourth shift stage herein) in which oil with line pressure PL is supplied to the first frictional engagement element (the second frictional clutch C2 herein), and the input-side rotational speed of the second frictional engagement element (the first frictional clutch C1), i.e., the turbine rotational speed Nt, does not rise, it is possible to prevent the occurrence of shift shock with a greater degree of certainty, even when oil with line pressure PL is employed.

Figure 6:
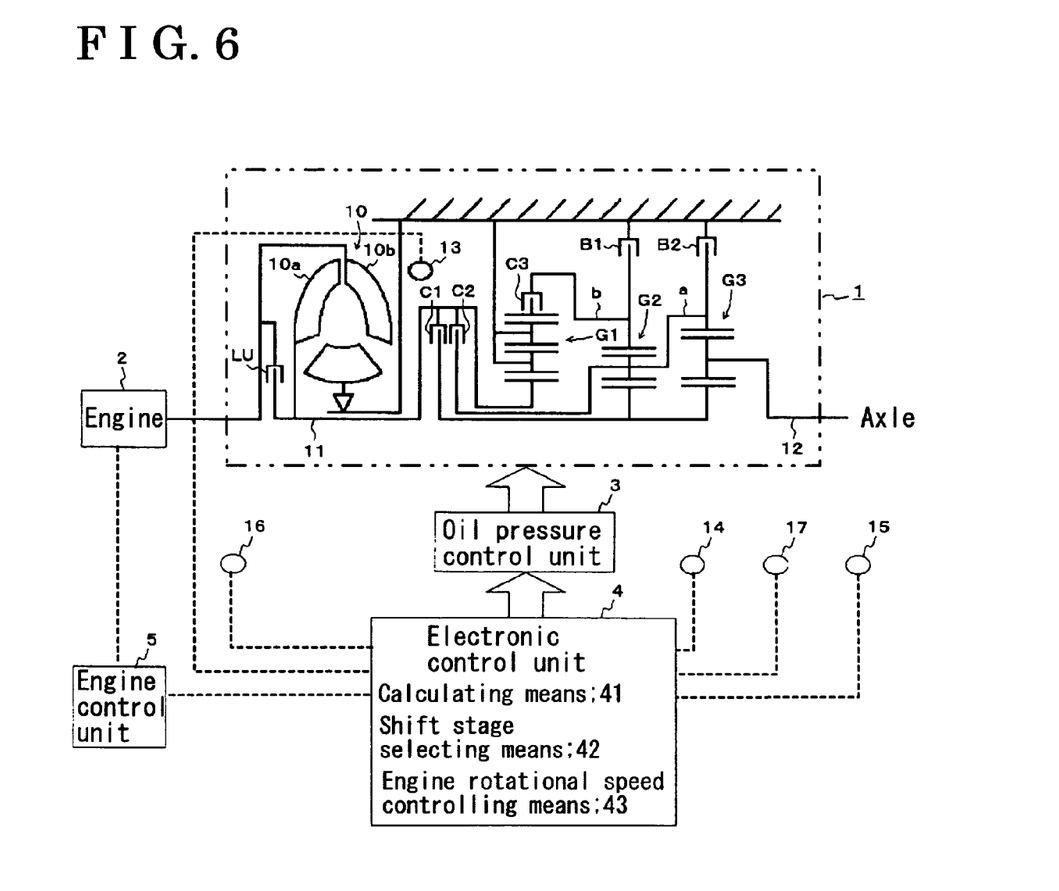
FIG. 6 is a block view schematically illustrating an entire structure of a transmission system having an oil pressure control apparatus for an automatic transmission according to a third embodiment of the present invention.

An oil pressure control apparatus for an automatic transmission according to a third embodiment of the present invention will be described below with reference to FIG. 6.

In the oil pressure control apparatus for an automatic transmission according to the second embodiment of the present invention, a shift stage in the transmission 1 is selected so as to supply oil with line pressure PL to the one (i.e., the first frictional engagement element), a shift stage in which the input-side rotational speed of the second frictional engagement element does not rise. However, in view of a vehicle speed, it may on occasions be difficult to select a shift stage, in which oil with line pressure PL is supplied to the first frictional engagement element, in which the minimum difference exists between the output-side rotational speed of the first fictional engagement element and the input-side rotational speed of the second frictional engagement element corresponding to the first frictional engagement element, and in which the input-side rotational speed of the second frictional engagement element does not rise. In other words, there may be a shift stage, in which the input-side rotational speed of the second frictional engagement may rise despite that a minimum difference exists between the output-side rotational speed of the first frictional engagement element for this shift stage and the input-side rotational speed of the second frictional engagement element.

In light of the foregoing, in the oil pressure control apparatus for an automatic transmission according to the second embodiment of the present invention, the electronic control unit 4 includes: a shift stage selecting means 42 for selecting a shift stage, in which oil with line pressure PL is supplied to the first frictional engagement element, in which a minimum difference exists between the output-side rotational speed of the first frictional engagement element and the input-side rotational speed of the second frictional engagement element corresponding to the first frictional engagement element, and in which the input-side rotational speed of the second frictional engagement element rises in the event that the first and second frictional engagement elements are respectively engaged; and an engine rotational speed controlling means 43 for controlling the engine rotational speed Ne so as to synchronize the output-side rotational speed of the first frictional engagement element for the shift stage selected by the shift stage selecting means 42 with the input-side rotational speed (the turbine runner rotational speed Nt) of the second frictional engagement element corresponding to the first frictional engagement element.

The electronic control unit 4 according to the third embodiment of the present invention is electrically connected to an engine control unit 5. The engine rotational speed controlling means 43 of the electronic control unit 4 controls, via the engine control unit 5, the engine rotational speed Ne so as to synchronize the output-side rotational speed of the first frictional engagement element for the shift stage selected by the shift stage selecting means 42 with the input-side rotational speed of the second frictional engagement element corresponding to the first frictional engagement element. The engine control unit 5 stores information relevant to engine activating conditions, calculates in accordance with predetermined programs, and controls an actuator of each an injector and an igniter. The other structures and functions of the oil pressure control apparatus for an automatic transmission according to the third embodiment are the same as those according to the second embodiment so that explanation thereof is omitted.

An operation of the oil pressure control apparatus for an automatic transmission according to the third embodiment is explained below.

The output-side rotational speed of at least each frictional engagement element, which is supplied with oil of line pressure, is calculated on the basis of the output shaft rotational speed No at the time a shift lever is switched from an N range to a D range. As is summarized in Table 3, according to the third embodiment of the present invention, the frictional engagement elements, which are subjected to line pressure, are the first frictional clutch C1 and the second frictional clutch C2. As described above, it is preferable that the output-side rotational speed of each frictional engagement element is calculated on the basis of the output shaft rotational speed No. Alternatively, the output-side rotational speed of each frictional engagement element can be calculated on the basis of a vehicle speed at the time that a shift lever is switched from an N range to a D range.

In the next place, after calculating the output-side rotational speeds, the electronic control unit 4 determines a shift stage from among the third, fourth, fifth and sixth shift stages, a shift in which line pressure is applied to the first frictional engagement element, in which the minimum difference exists between the output-side rotational speed of the first frictional engagement element and the input-side rotational speed of the second frictional engagement element corresponding to the first frictional engagement element, and in which the input-side rotational speed of the second frictional engagement element rises. The electronic control unit 4 then controls the engine rotational speed Ne so as to synchronize the output-side rotational speed of the first frictional engagement element with the input-side rotational speed of the second frictional engagement element. After the synchronization thereof, oil pressure to be supplied is controlled.

As described above, according to the third embodiment of the present invention, if a shift stage is selected, a shift stage (the fourth shift stage herein) in which oil with line pressure PL is supplied to the first frictional engagement element (the second frictional clutch C2 herein) which increases the input-side rotational speed (the turbine runner rotational speed Nt), it is possible to prevent the occurrence of shift shock with a greater degree of certainty, even when oil with line pressure PL is employed.

Figure 7:
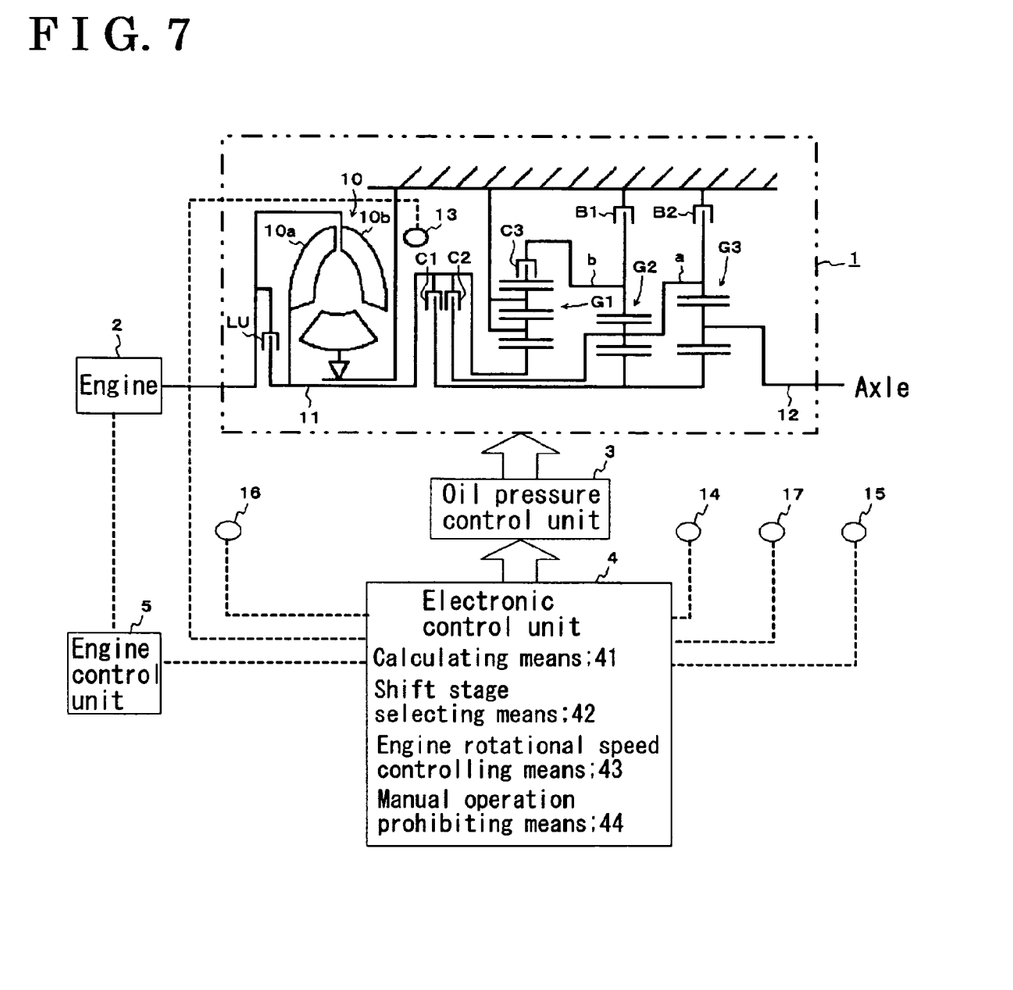
FIG. 7 is a block view schematically illustrating an entire structure of a transmission system having an oil pressure control apparatus for an automatic transmission according to a fourth embodiment of the present invention.

An oil pressure control apparatus for an automatic transmission according to a fourth embodiment of the present invention will be described below with reference to FIG. 7.

In the eventuality that an accelerator pedal is operated by accident while a shift lever is positioned at an N range, the engine rotational speed Ne on occasions is increased in response to changes of an accelerator opening degree. Oil pressure control may not be performed appropriately in such circumstances. In light of the forgoing, the electronic control unit 4 of the oil pressure control apparatus for an automatic transmission according to the fourth embodiment of the present invention includes a manual operation prohibiting means 44 for prohibiting a manual operation of an accelerator pedal at the time of a shift operation from a neutral shift stage to another shift stage in the transmission 1 appropriate to a vehicle driving condition. In practical terms, even when an accelerator pedal is operated by accident while a shift lever is positioned at an N range, an accelerator pedal can be still operated manually by a driver. However, the electronic control unit 4 does not receive any signal of command in response to the operation of the accelerator pedal. That is, the manual operation prohibiting means 44 according to the fourth embodiment of the present invention serves as a means for ignoring such operation of an accelerator pedal.

An operation of the oil pressure control apparatus for an automatic transmission according to the fourth embodiment of the present invention will be described herein.

A manual operation of an accelerator pedal is prohibited or ignored from a time that the shift lever is switched from an N range to a D range to a time that a shift operation is completed. While a manual operation of an accelerator pedal is prohibited or ignored, the output-side rotational speed of at least each frictional engagement element, which is supplied with oil of line pressure, is calculated on the basis of the output shaft rotational speed No at the time a shift lever is switched from an N range to a D range. As is summarized in Table 3, according to the third embodiment of the present invention, the frictional engagement elements, which are subjected to line pressure, are the first frictional clutch C1 and the second frictional clutch C2. As described above, it is preferable that the output-side rotational speed of each frictional engagement element is calculated on the basis of the output shaft rotational speed No. Alternatively, the output-side rotational speed of each frictional engagement element can be calculated on the basis of a vehicle speed at the time that a shift lever is switched from an N range to a D range.

In the next place, after calculating the output-side rotational speeds, the electronic control unit 4 determines a shift stage from among the third, fourth, fifth and sixth shift stages, a shift in which line pressure is applied to the first frictional engagement element, in which the minimum difference exists between the output-side rotational speed of the first frictional engagement element and the input-side rotational speed of the second frictional engagement element corresponding to the first frictional engagement element, and in which the input-side rotational speed of the second frictional engagement element rise. The electronic control unit 4 then controls the engine rotational speed Ne so as to synchronize the output-side rotational speed of the first frictional engagement element with the input-side rotational speed of the second frictional engagement element. After the synchronization thereof, oil pressure to be supplied can be controlled.

As described above, according to the fourth embodiment of the present invention, even after an accelerator pedal has been operated by accident by a driver, an increase in the engine rotational speed Ne can be effectively prevented, and thus it is possible to prevent the occurrence of shift shock with a greater degree of certainty.

The principles, the preferred embodiments and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An oil pressure control apparatus for an automatic transmission comprising:

plural frictional engagement elements capable of establishing plural forward shift stages in a automatic transmission by combinations of engagement and disengagement of the plural frictional engagement elements; and a controller configured to select at least one of the plural frictional engagement elements to be supplied with oil pressure in accordance with one of the combinations of engagement and disengagement of the plural frictional engagement elements and to supply oil pressure to the at least one of the plural frictional engagement elements, the controller comprising:

a calculating means for calculating, on a basis of information relevant to an output rotational speed from an output shaft rotational speed sensor, at a time of a shift operation from a neutral shift stage to one of the plural forward shift stages, an output-side rotational speed of each of the plural frictional engagement elements capable of establishing the plural forward shift stages; and a shift stage selecting means for selecting a shift stage from among the plural forward shift stages without a shift map on the basis of a vehicle speed, wherein in the shift stage selected by the shift stage selecting means, oil with line pressure is supplied to a first frictional engagement element from among the plural frictional engagement elements and a second frictional engagement element corresponding to the first frictional engagement element from among the plural frictional engagement elements for the shift stage selected by the shift stage selecting means, and wherein in the shift stage selected by the shift stage selecting means, a difference between the output-side rotational speed of the first frictional engagement element and an input-side rotational speed of the second frictional engagement element is a minimum of those between the output-side rotational speed of the first frictional engagement elements for the plural forward shift stages and the input-side rotational speed of the second frictional engagement elements for the plural forward shift stages.

2. An oil pressure control apparatus for an automatic transmission according to claim 1, wherein the controller includes a manual operation prohibiting means for prohibiting a manual operation of an accelerator pedal at a time of the shift operation from the neutral shift stage to the another shift stage appropriate to the vehicle driving condition.

3. An oil pressure control apparatus for an automatic transmission according to claim 1, wherein the input-side rotational speed of the second frictional engagement element is calculated on a basis of a rotational speed of a turbine runner of a torque converter.

4. An oil pressure control apparatus for an automatic transmission according to claim 1, wherein the calculating means calculates the output-side rotational speed of each of the plural first frictional engagement elements on a basis of the output rotational speed from the output shaft rotational speed sensor and a gear ratio of the shift stage selected by the shift stage selecting means.

5. An oil pressure control apparatus for an automatic transmission comprising:

a plurality of frictional engagement elements for plural forward shift stages, wherein one shift stage is established by one combination of at least two frictional engagement elements selected from among the plurality of the frictional engagement elements and a plurality of different shift stages are established by plural combinations of the frictional engagement elements;

wherein at least two frictional engagement elements in each combination are composed of an engagement element provided at an input side and an engagement element provided at an output side;

selecting means for selecting the combination in which a difference between an input-side rotational speed of the engagement element provided at the input side and an output-side rotational speed of the engagement element provided at the output side is a minimum of those of the plural combinations in order to select a shift stage from among the plural forward shift stages without a shift map on the basis of a vehicle speed at a time of a shift operation from a neutral shift stage to one of the plural forward shift stages, and a controller for selecting the frictional engagement element to be supplied with oil pressure in accordance with the combination selected by the selecting means and controlling the oil pressure.

* * * * *